(12) United States Patent
Brown

(10) Patent No.: US 6,420,982 B1
(45) Date of Patent: Jul. 16, 2002

(54) MULTI-STAGE LOOKUP FOR TRANSLATING BETWEEN SIGNALS OF DIFFERENT BIT LENGTHS

(75) Inventor: David A. Brown, Carp (CA)

(73) Assignee: MOSAID Technologies, Inc., Kanata (CA)

(*) Notice: Subject to any disclaimer, the term of this patent is extended or adjusted under 35 U.S.C. 154(b) by 0 days.

(21) Appl. No.: 10/022,932

(22) Filed: Dec. 18, 2001

Related U.S. Application Data (63) Continuation of application No. 09/533,724, filed on Mar. 23, 2000.

(51) Int. Cl.[7] ............................................. H03M 7/00
(52) U.S. Cl. ........................ 341/106; 341/120; 341/118
(58) Field of Search .................................. 341/120, 118

(56) References Cited

U.S. PATENT DOCUMENTS 5,504,743 A    4/1996   Drefenstedt ................ 370/60.1
5,852,607 A    12/1998  Chin .......................... 370/401

FOREIGN PATENT DOCUMENTS

EP    0 594 196 A1    4/1994

*Primary Examiner*—Peguy JeanPierre
*Assistant Examiner*—Joseph Lauture
(74) *Attorney, Agent, or Firm*—Hamilton, Brook, Smith and Reynolds, P.C.

(57) ABSTRACT

A method and apparatus is provided for translating an L-bit put signal to a W-bit output signal such as a virtual network identification signal to an internal virtual network signal. The translation is performed using a multi-stage lookup. The input signal is portioned into a plurality of subsets of bits. A first index to a first stage is provided by combining a portion of bits and a first delta subset of bits. A second index to a second stage is provided by combining data stored at the first index in the first stage and the a second delta subset of bits. The corresponding output signal is stored at the last index in the last stage. The use of the multi-stage lookup instead of a single-stage lookup reduces the memory required to perform the translation.

16 Claims, 11 Drawing Sheets

| PHYSICAL LAYER (L1) HEADER | DATA LINK LAYER (L2) HEADER | NET-WORK LAYER (L3) HEADER | NET-WORK LAYER (L4) HEADER | DATA | CHECK SUM |
|---|---|---|---|---|---|
| 102 | 104 | 106 | 108 | 110 | 112 |

| L2 DESTINATION ADDRESS(DA) (6 BYTES) | L2 SOURCE ADDRESS(SA) (6 BYTES) | VLAN ID (OPTIONAL) TAG (12 BITS) TAG PROTOCOL CONTROL INDENTIFIER INFORMATION (TPID) (TCI) | | LENGTH/ TYPE (2 BYTES) |
|---|---|---|---|---|
| 114 | 116 | 118a | 118b | 120 |

MULTI-STAGE LOOKUP FOR TRANSLATING BETWEEN SIGNALS OF DIFFERENT BIT LENGTHS

RELATED APPLICATIONS

This application is a continuation of U.S. application Ser. No. 09/533,724, entitled "Multi-Stage Lookup for Translating Between Signals of Different Bit Lengths" by David A. Brown, filed Mar. 23, 2000. The entire teachings of the above application is incorporated herein by reference.

BACKGROUND OF THE INVENTION

A networking switch receives data packets from a number of ingress ports connected to the switch and forwards the data packets to one or more egress ports connected to the switch. The switch determines the egress port to which the data packets are forwarded dependent on a destination address and other fields included in the data packet.

The data packet received at an ingress port includes network protocols encoded in one or more headers included in the data packet. The headers are a standard length specified by the network protocols.

Figure 1A:
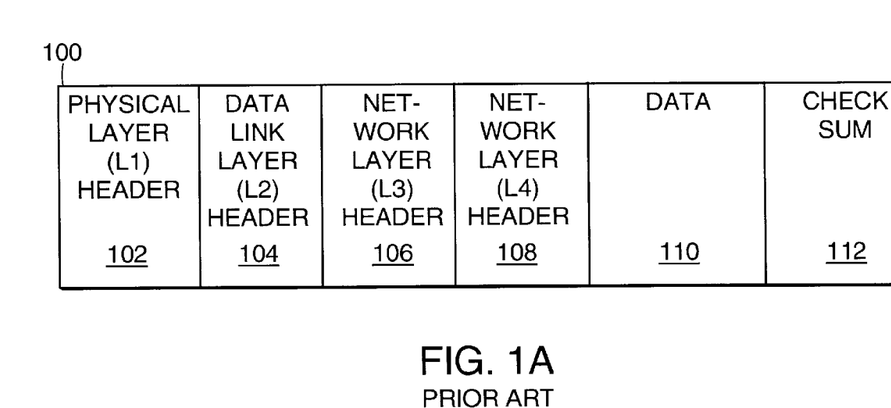
FIG. 1A illustrates a prior art data packet which may be received on an ingress port connected to the switch.

FIG. 1A illustrates a prior art data packet 100. The data packet includes a physical layer (L1) header 102, a data link layer (L2) header 104, a network layer (L3) header 106 and a transport layer (L4) header. A payload for the data packet is stored in a data field 110 and the data packet 100 also includes a checksum 112.

Figure 1B:
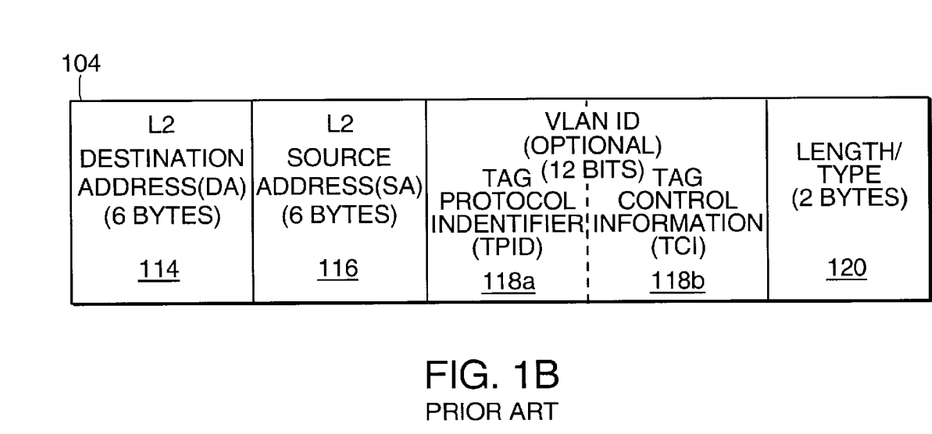
FIG. 1B illustrates a prior art Ethernet data link layer (L2) header which may be included in the data packet shown in FIG. 1A.

FIG. 1B illustrates a prior art Ethernet protocol header stored in the data link (L2) header 104 shown in FIG. 1A. The length of the Ethernet protocol header is a fixed number of bits which is specified by the standard Ethernet protocol. The data link (L2) header 104 includes a 6-byte L2 destination address 114, a 12-bit Virtual Local Area Network Identifier ("VLAN ID") 118 and a 2-byte length/type field 120.

The network switch forwards data packets from one Local Area Network ("LAN") segment connected to the switch to another LAN segment connected to the switch. The switch determines whether a data packet received from one LAN segment is to be forwarded to another LAN segment. A broadcast data packet received at an ingress port in the switch is forwarded to all members of the LAN and thus consumes a large proportion of the LAN's bandwidth. In order to reduce the number of broadcast data packets forwarded on a LAN, members of a physical LAN are added to logical groups called Virtual LANs. A broadcast data packet is only forwarded to members of the Virtual LAN from which it originated. The virtual LAN is encoded in the VLAN ID 118 included in the Ethernet protocol header stored in the data link (L2) header 104 in the received data packet.

The 12-bit VLAN ID 118 allows a physical LAN to have up to $2^{12}$ (4096) VLANS. Typically, not all $2^{12}$ VLANS are used, but a 12-bit VLAN ID 118 is forwarded in the data link layer (L2) header 104 included in each Ethernet protocol data packet received by the switch. If the switch supports a subset of the $2^{12}$ VLANS per physical LAN, for example, $2^8$ (256) VLANS, the switch may translate the 12-bits received in the VLAN ID to an 8-bit Internal VID ("IVID"). The use of an 8-bit IVID in the switch reduces the memory required in the switch for forwarding a VLAN ID with each data packet internally in the switch.

Figure 1C:
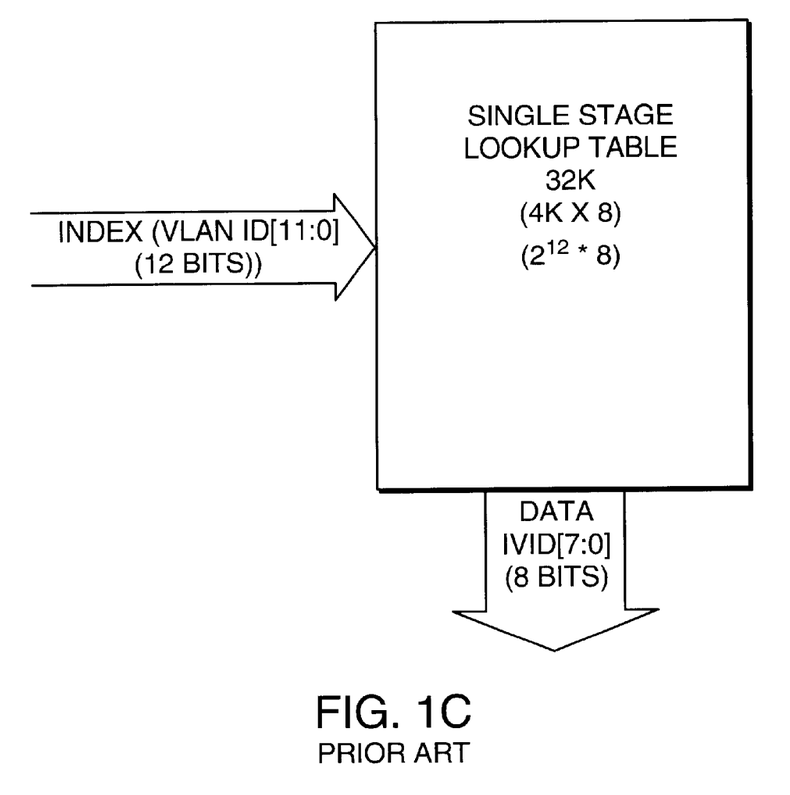
FIG. 1C illustrates a prior art single stage memory lookup table for translating a 12-bit signal to an 8-bit signal.

The translation of a relatively small number of bits (12-bit VLAN) to a smaller number of bits (8-bit IVID) is typically performed using a lookup table. An example of one such prior art lookup table is shown in FIG. 1C. The prior art lookup table includes an entry for each possible VLAN; that is, $2^{12}$ (4096) IVID entries. Each IVID entry is eight-bits wide, thus the size of the lookup table is 32K-bits (4096×8). There are a maximum of $2^8$ (256) possible IVID values stored in 256 of the 4096 IVID entries in the lookup table. Thus, the use of a 32K lookup table to translate a 12-bit VLAN ID to an 8-bit IVID consumes more memory than is necessary to store the 256 possible IVID entries by providing a location for each of the 4096 possible VLAN IDs.

An alternative method for translating one number of bits to a smaller number of bits is to use a hash function. A hash function is typically used to convert a large memory space to a small memory space, such as to map a 48-bit (6 bytes) L2 destination address 114 to a smaller number of bits. Hash function logic performs a hash function on the L2 destination address 114 and uses the result of the hash function to search an address space smaller than the $2^{48}$ entries dependent on the smaller number of bits which is required for the original number of bits.

However, the use of a hashing function to translate a relatively small number (12-bit VLAN ID) to a smaller number (8-bit IVID) does not significantly reduce the memory requirements in order to justify adding the complex logic required to perform the hash function.

SUMMARY OF THE INVENTION

We present a multi-stage lookup table for translating a first signal having a first number of bits to a second signal having a second number of bits less than the first number of bits. Portioning logic portions the first number of bits into a portion of bits and a delta subset of bits. The size of the portion of bits is at least the size of the second number of bits. Memory access logic sequentially performs a lookup in each of a plurality of memory elements. The number of memory elements is dependent on the number of delta subsets. The memory access logic performs a first lookup to a first memory element using a first index equal to the portion of bits. The memory access logic performs a next lookup to a next memory element using a next index equal to a combination of a result of the previous lookup and a next delta subset of bits. The second signal results from a last lookup to a last memory element.

Preferably, the number of memory elements is two or four. The size of the memory element is dependent on the size of an index equal to the number of bits in the subset of bits and the number of bits in the delta subset of bits. The width of the memory element is dependent on the number of bits in the second signal.

In one embodiment, the number of memory elements is two and the number of bits in the delta subset is two to provide a 2-stage lookup to translate a first set of 12-bits to a second set of 8.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 2:
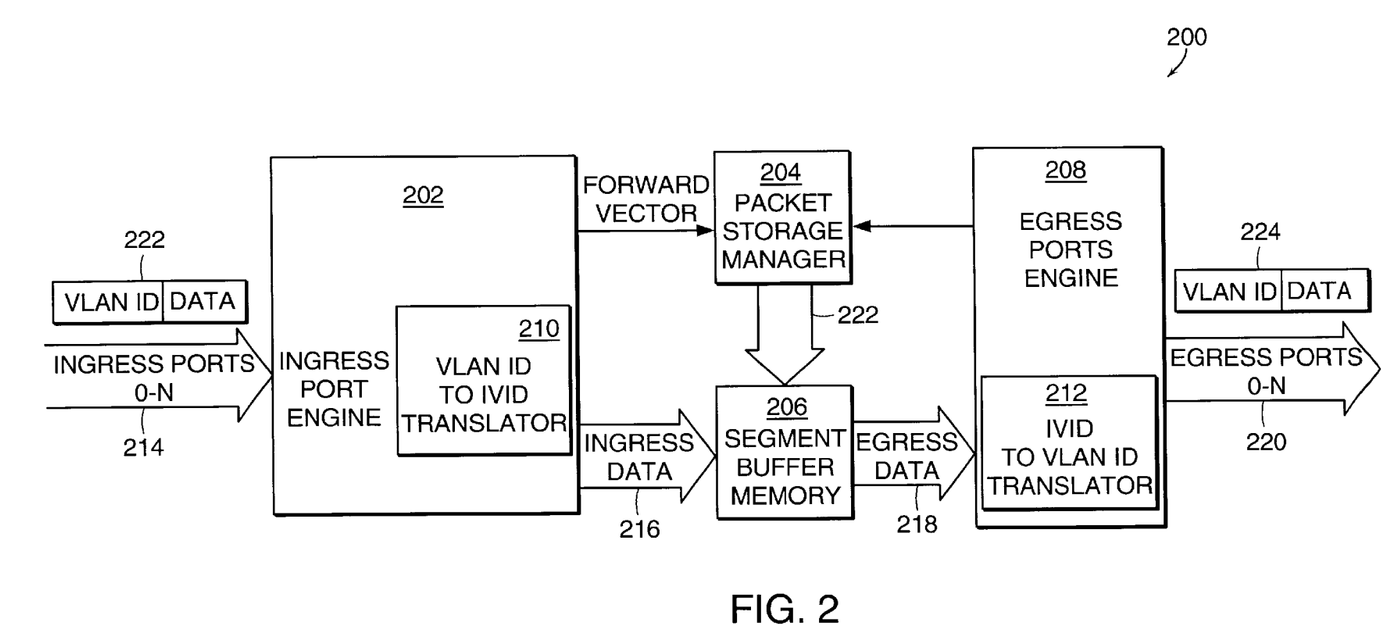
FIG. 2 illustrates a switch including a VLAN ID to IVID translator for translating a 12-bit VLAN ID to an 8-bit IVID according to the principles of the present invention.

FIG. 2 illustrates a network switch 200 including a VLAN ID to IVID translator 210 in an ingress port engine 202 for translating a VLAN ID stored in a data packet 222 received at an ingress port 214 connected to the switch 200. A data packet 222 received at any one of the ingress ports 0–N 214 is processed in the ingress ports engine 202.

After the VLAN ID stored in the received data packet 222 has been translated to a smaller IVID, the ingress modified data packet forwarded on ingress data path 216 is stored in segment buffer memory 206 and is forwarded to the egress ports engine 208 on egress data path 218. The egress ports engine 208 translates the IVID to a VLAN ID in the IVID to VLAN ID translator 212 and forwards the egress modified data packet 224 to one or more egress ports 220 dependent on the contents of the header included in the egress modified data packet 224. The IVID to VLAN ID translator 212 is described in co-pending U.S. Pat. application Ser. No. 09/453,344, filed Dec. 1, 1999, entitled "Method and Apparatus for Wire Speed IP Multicast Forwarding," by David A. Brown, the entire teachings of which are incorporated herein by reference in its entirety.

Figure 3A:
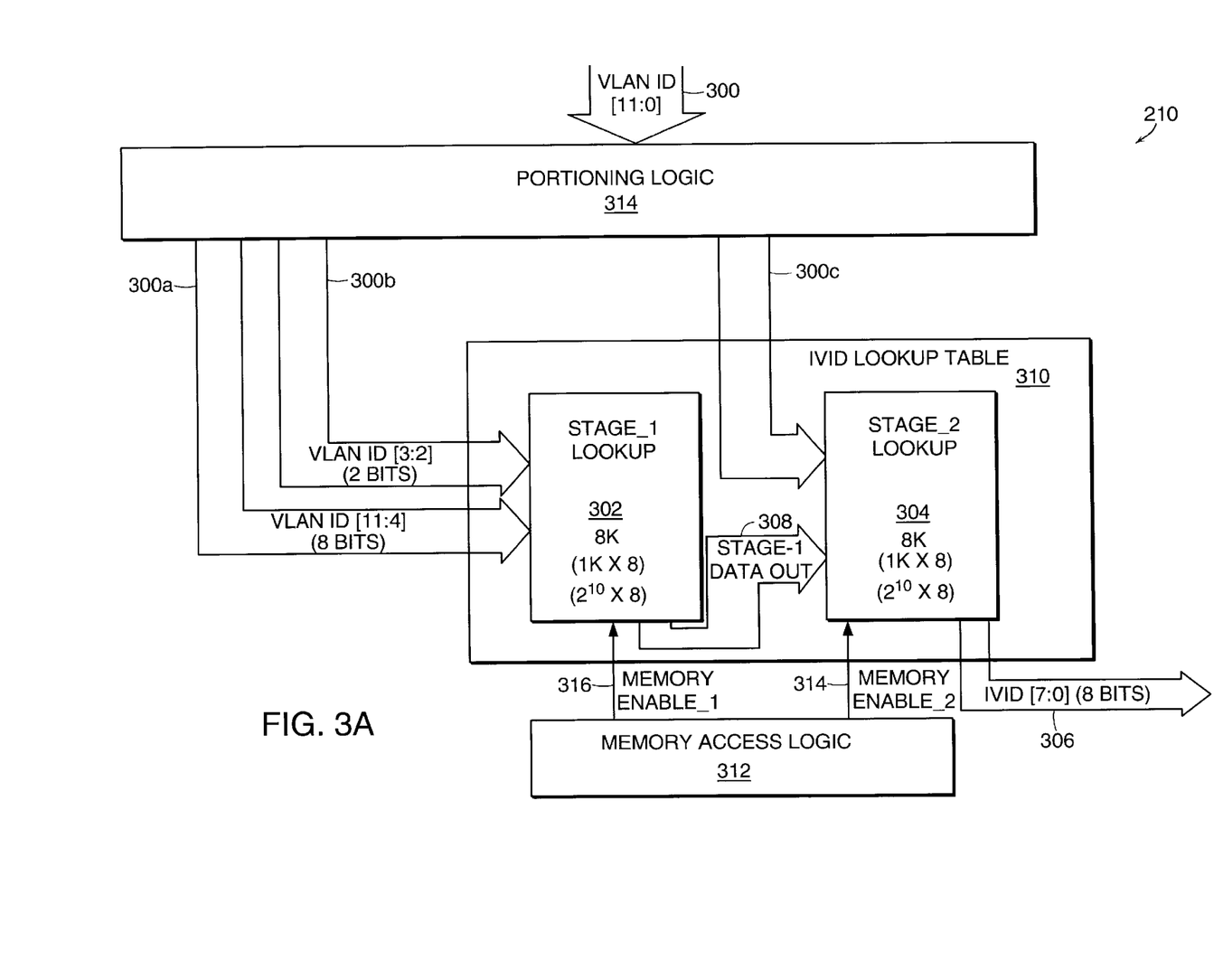
FIG. 3A illustrates an IVID lookup table in the VLAN ID to IVID translator shown in FIG. 2 for translating 12-bit VLAN ID to an 8-bit IVID.

FIG. 3A illustrates an embodiment of an IVID lookup table in the VLAN ID to IVID translator 210 shown in FIG. 2. The IVID lookup table 310 translates a 12-bit VLAN ID 300 to an 8-bit IVID 306. The IVID lookup table 310 is a multi-stage lookup table including a stage_1 lookup 302 and a stage_2 lookup 304. Both the stage_1 lookup 302 and the stage_2 lookup 304 are eight-bits wide and store $2^{10}$ (1024) IVID entries. The stage lookup 302, 304 can be a Static Random Access memory ("SRAM"). Thus, the IVID lookup table 310 stores 16K-bits (1024 IVID entries×8-bits×2 stage lookups) which is half the size of the 32K-bits required in the single stage prior art lookup table 100 described in conjunction with FIG. 1C. Portioning logic 314 portions the VLAN ID 300 into a plurality of subsets of bits 300a–c. The portioning of the VLAN ID 300 is described in conjunction with FIG. 3B.

Figure 3B:
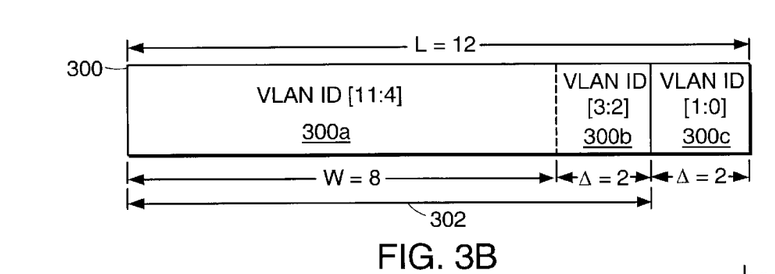
FIG. 3B illustrates the 12-bit VLAN ID shown in FIG. 3A portioned into a plurality of subset of bits.

FIG. 3B illustrates the 12-bit VLAN ID 300 shown in FIG. 3A portioned into a plurality of subsets of bits. The VLAN ID 300 is portioned into a portion of bits 302 and a second delta subset of bits 300c. The portion of bits 302 includes a first subset of bits 300a and a first delta subset of bits 300b. The portion of bits 302 is the index to the stage_lookup 302.

The first subset of bits 300a stores the eight Most Significant bits ("MSBs") (VLAN ID [11:4]) of the VLAN ID 300. Each of the first delta subset of bits 300b and the second delta subset of bits 300c stores two bits of the VLAN ID 300, with the first delta subset of bits 300b storing the next MSBs (VLAN[3:2]) and the second delta subset of bits 300c storing the Least Significant Bits ("LSBs") (VLAN[1:0]) of the VLAN ID 300.

Continuing with FIG. 3A, the VLAN ID 300 provides an index to the IVID lookup table 310. Memory access logic 312 enables access to each stage lookup 302, 304 through memory enable signals 316 and 314. The first portion of bits 302 including the first subset of bits 300a and the first delta subset of bits 300b (VLAN ID [11:2]) is forwarded to provide the 10-bit index to the 8-bit stage_1 lookup 302. With memory enable_1 signal 316 enabling access to stage_1 lookup 302, the 10-bit index selects one of the 8-bit entries stored in the stage_1 lookup 302. The data stored in the selected entry is forwarded on stage_1 data out 308 to the stage_2 lookup 304. The stage_1 data out 308 and the second delta subset of bits 300c (VLAN ID[1:0]) combine (as will be described in further detail below) to provide the 10-bit index to the stage_2 lookup 304. With memory enable_2 signal 314 enabling access to stage_2 lookup 304, the 10-bit index selects one of the 8-bit entries stored in the stage_2 lookup 304. The data stored in the selected entry in stage_2 lookup 304 is the 8-bit IVID 306 translation of the 12-bit VLAN ID 300.

The size of the prior art single stage IVID lookup table shown in FIG. 1C is dependent on the number of bits in the VLAN ID 300 and the number of output bits IVID, to be translated. Thus, for a 12-bit VLAN ID and an 8-bit IVID, a 32K-bits IVID lookup table is required. A two stage IVID lookup table is provided by portioning the VLAN ID such that, the first subset of bits 300a contains at least the same number of bits as the IVID 306 (8-bits). The number of delta subsets of bits 300b, 300c determines the number of lookup stages 302, 304. The number of bits in the first subset of bits 300 and the first delta subset of bits 300b determines the size of each lookup stage.

Figure 3C:
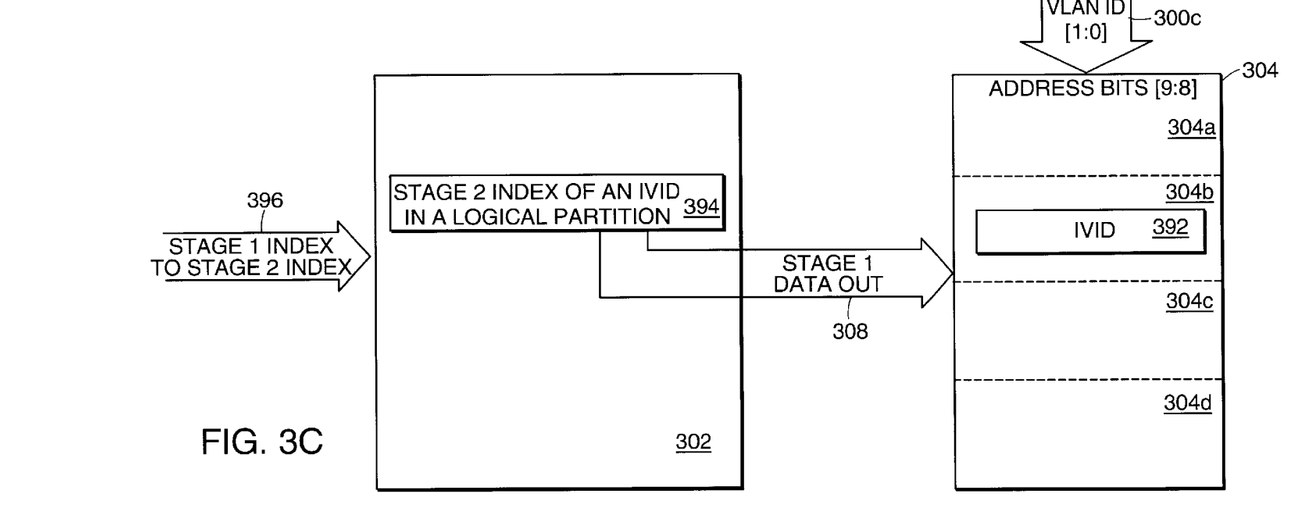
FIG. 3C illustrates an 8-bit IVID stored in the IVID lookup table shown in FIG. 3A.

FIG. 3C illustrates an 8-bit IVID 392 stored in the stage_2 lookup shown in FIG. 3A.

The lookup table is portioned into a plurality of memory stages. The stage_1 data out 308 and the second delta subset of bits 300c (VLAN ID[1:0]) combine to provide the 10-bit index to the stage_2 lookup 304. The 10-bit index including the 8-bit LSBs from the previous stage and the 2-bit MSBs from VLAN ID[1:0] selects one of the 8-bit entries to be stored in the stage_2 lookup 304. The delta subset of bits selects one of four entries in the last stage at which the IVID 306 is stored.

The last stage includes a plurality of logical partitions. Each logical partition includes locations for storing all possible IVIDs. The number of logical partitions in the last stage is dependent on a delta subset of bits. With a delta subset of bits equal to two, there are four logical partitions in the last stage. The delta subset of bits determines the logical partition in the last stage in which the IVID 306 is stored. The previous stage to the last stage provides the index at which the IVID is stored within the selected logical partition. Thus, the index provided by the previous stage includes sufficient bits to index each location in a logical partition.

As shown in FIG. 3C, the stage_2 lookup 304 includes four logical partitions 304a–d. The number of logical partitions 304a–d is determined by the number of bits in the delta subset of bits. The number of bits in the delta subset of bits 300c is selected so that each of the logical partitions 304a–c includes a location for each possible 8-bit IVID 392. Thus, each logical partition 304a–d is 2K bits in an 8K stage_2 lookup 304 storing 8-bit IVIDs 392 and the number of bits in the delta subset 300c is 2. The stage_2 index of the IVID in the logical partition 394 is stored in the stage_1 lookup 302.

To translate the VLAN ID to an IVID, a portion of the VLAN ID; that is, an index to the stage_2 index of the IVID in a logical partition 396 is forwarded to stage_1 lookup 302. The stage_2 index of IVID in a logical partition 394 is forwarded on stage_1 data out 308 as the index to select the location of the IVID in each one of the stage_2 lookup logical partitions 304a–d. The LSBs of the VLAN ID 300c are forwarded to the stage_2 lookup 304 to select the one stage_2 lookup logical partition 304a–d in which the IVID 392 is stored. To select the logical partitions in the stage_2 lookup 304, the 2 LSBs of the VLAN ID[1:0] are connected to the 2 MSBs of the stage_2 lookup's address bits. In an alternative embodiment, the 2 LSBs of the VLAN ID[1:0] may be connected to other than the 2 MSBs of the stage_2 lookup's address bits.

Overall, storage requirements are reduced because in a multiple stage lookup table, the output stage needs only to store a small number of words per possible output as compared to the one word per possible input required by a single stage lookup table. Specifically, in a conventional single stage table, the memory size is dictated by the number of possible input values or $2^L$ for an L bit input. On the other hand, with a multiple stage table, each stage is sized to correspond to a multiple of the lesser number of possible outputs such as $2^{delta\ subset\ of\ bits} \times 2^w$ for a W bit output. For example, if a 12 bit input is reduced to 8 bits, a single stage requires storage for $2^{12}$ words. However, with two stages, the final stage can be reduced to a storage requirement of $(2^2 \times 2^8) = 2^{10}$ words, and the first stage only needs storage for $2^{10}$ possible inputs since only ten bits of the 12 bit input are applied to that stage. Two stages, each of $2^{10}$ words, with a total memory size of $2^{11}$, are smaller than a single $2^{12}$ word stage.

Figure 3D:
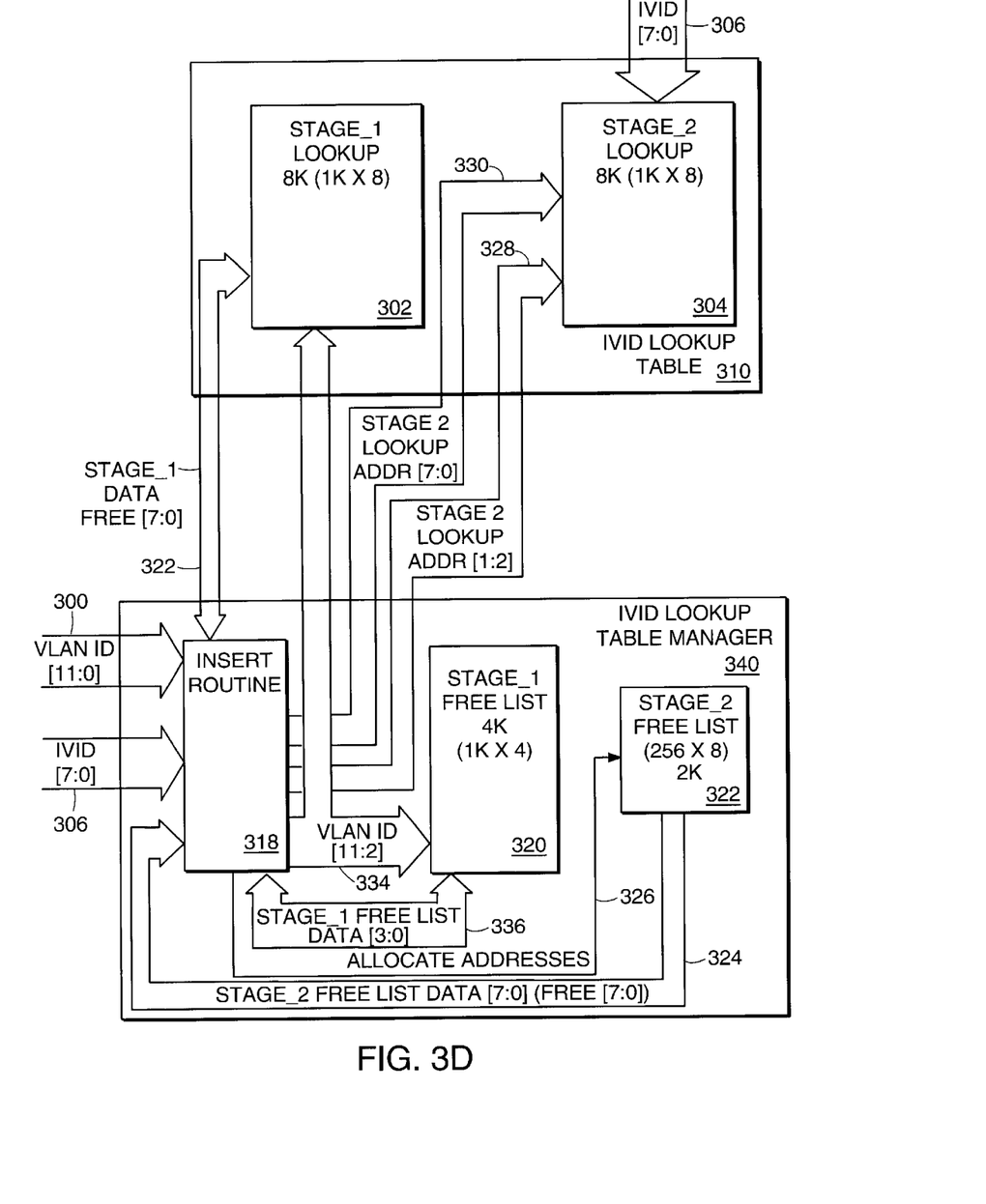
FIG. 3D is a block diagram illustrating an insert routine in an IVID lookup table manager for inserting an IVID in the IVID lookup table shown in FIG. 3A.

FIG. 3D is a block diagram illustrating an insert routine 318 in the IVID lookup table manager 340 for inserting an IVID into the IVID lookup table 310. Typically, the IVID lookup table manager 340 would be implemented in software, but it is conceivable that the lookup table manager 340 could also be implemented in hardware. The IVID lookup table manager 340 includes a stage_1 free list 320 and a stage_2 free list 322. Each 8-bit location in the stage_2 free list 322 identifies four IVID locations in the stage_2 lookup 304. The stage_2 free list 322 includes 256 8-bit locations. Thus, the size of the stage_2 free list 322 is 2K bits. The stage_1 free list 320 includes 1K 4-bit locations. Thus, the size of the stage_1 free list 320 is 4K bits.

An entry stored in a location in the stage_1 free list 320 identifies which of the IVID locations in the stage_2 lookup 304 identified by the entry store an IVID 306. The stage_1 free list 320 includes 1K 4-bit entries, each 4-bit entry includes one bit for identifying if any of the four IVID location in the stage_2 lookup 304 is in use. A bit is set if an IVID 306 is stored at the respective location in the stage_2 lookup 304.

The stage_2 lookup 304 has four logical partitions with each logical partition having $2^8$ locations. Thus, only $2^8$ VID-IVID translations can be stored at any time. Thus, when an IVID-VID translation is no longer required, the location of the freed entry in the stage_2 lookup 304 is returned to the stage_2 free list 322 so that it can be used to store another VID-IVID translation. However, the location of the freed entry can not be returned to the stage_2 free list 322 until all four locations in the stage_2 lookup 304 sharing the same 8 LSBs are no longer required. Thus, the stage_1 free list 320 stores the status of each of the four locations sharing the same 8 LSBs in the stage_2 lookup 304.

Figure 3E:
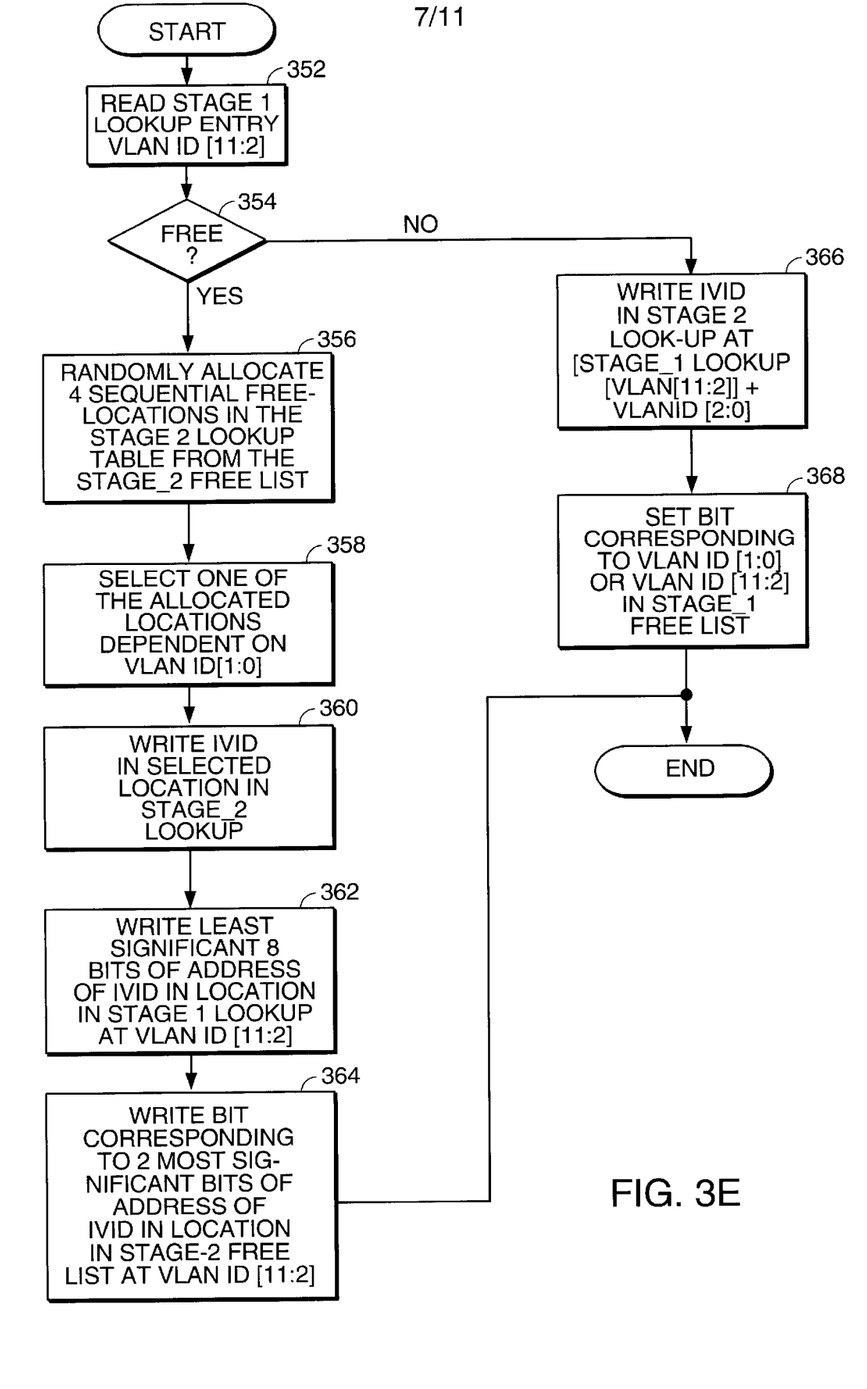
FIG. 3E is a flowchart illustrating the steps performed in the insert routine shown in FIG. 3D for inserting an IVID in the IVID lookup table.

FIG. 3E is a flowchart illustrating the steps performed in the insert routine 318 shown in FIG. 3D to insert an IVID 306 in the IVID lookup table 310. The flowchart is described in conjunction with FIG. 3D.

At step 352, the insert routine 318 forwards the 10 Most Significant Bits ("MSB") VLAN ID[11:2] 334 of the VLAN ID to the stage_1 free list 320 to determine if a location in stage_2 lookup 322 has previously been allocated for the VLAN ID. The insert routine 318 reads the entry stored at VLAN ID[11:2] 334. The 4-bit entry stored at VLAN ID[11:2] 334 is returned on stage_1 free list data 336 to the insert routine 318. Processing continues with step 354.

At step 354, the insert routine 318 examines the bits in the stage_1 free list data 336 returned. If any of the bits in the returned stage_1 free list data 336 are set, indicating that the location has previously been allocated, processing continues with step 366. If not, processing continues with step 356 in order to allocate a location.

At step 356, none of the bits in the stage_1 free list data 336 are set indicating that an IVID location in the stage_2 lookup 304 has not previously been allocated to store an IVID 306 for the VLAN ID 300. The insert routine 318 requests four 8-bit entries in stage_2 lookup 304 by issuing an allocate addresses request 326 to the stage_2 free list 322. An 8-bit entry in the stage_2 free list is selected. The 8-bit entry stores the 8 LSBs of 4 locations in stage_2 lookup in which the IVID 306 may be stored. The 8 LSBs are forwarded to the insert routine 318 on stage_2 free list data 324. Processing continues with step 358.

At step 358, the insert routine 318 forwards the data received on stage_2 free list data 324 from the stage_2 free list 322 to the stage_2 lookup 304 on the 8 LSBs of the stage_2 lookup address[7:0] 330. The insert routine 318 also forwards the 2 Least Significant Bits ("LSB") of the VLAN ID to the stage_2 lookup table 304 on the 2 MSBs of the stage_2 lookup address[9:8] 328. The 2 LSBs of the VLAN ID select which one of the four locations identified by the 8 LSBs at which to store the IVID 306. Processing continues with step 360.

At step 360, the insert routine 318 writes the IVID 306 in the location specified by the stage_2 lookup address forwarded on stage_2 lookup address[7:0] 330 and stage_2 lookup address[9:8] 328. Processing continues with step 362.

At step 362, the insert routine 318 forwards the 8 LSBs of the stage_2 lookup address 330 at which the IVID 306 is stored in the stage_2 lookup 304 on stage_1 data 332 to the stage_1 lookup 302 and forwards the VLAN ID 300 on VLAN ID[11:2] address 334 to stage_1 lookup 302. The insert routine 318 writes the stage_1 data 332 at the location specified by VLAN ID[11:2] 334. Processing continues with step 364.

At step 364, the insert routine 318 forwards VLAN ID[11:2] 334 to the stage_1 free list 320. The insert routine 318 decodes the two MSBs of the stage_2 lookup address [9:8] to set the bit of stage_1 free list data[3:0] 336 corresponding to the decoded MSBs and forwards stage_1 free list data[3:0] 336 to the stage_1 free list 320. The insert routine 318 writes stage_1 free list data[3:0] in stage_1 free list 320 at the location specified by VLAN ID[11:2] 334. Processing is complete.

At step 366, one or more of the other 3 locations allocated for the 10 MSBs of the VLAN ID 300 store IVIDs 306 therefore the 8 LSBs of the stage_2 lookup address 330 at which the IVID 306 to be stored is already written at the location specified by VLAN ID[11:2] 334 in stage_1 lookup 302. The insert routine 318 reads the 8 LSBs of the stage_2 lookup address from the stage_1 lookup 302 at the location specified by VLAN ID[11:2] 334 and forwards the stage_1 data 332 read on stage_2 lookup address[7:0] 330 to the stage_2 lookup 304. The insert routine 318 writes the IVD 306 at the location specified by the stage_2 lookup address [7:0] 330 and the stage_2 lookup address[9:8] 328. Processing continues with step 368.

At step 368, the insert routine 318 forwards VLAN ID[11:2] 334 to the stage_1 free list 320. The insert routine 318 decodes the two MSBs of the stage_2 lookup address [9:8] to set one bit of stage_1 free list data[3:0] 336. The insert routine 318 performs a read_modify_write on the data stored at VLAN ID[11:2] 334 in the stage_1 free list 320 to set the bit corresponding to the two MSBs of the stage_2 lookup address[9:8] without modifying the other bits. The insert routine 318 forwards the modified stage_1 free list data[3:0] 336 to the stage_1 free list 320 and writes stage_1 free list data[3:0] in stage_1 free list 320 at the location specified by VLAN ID[11:2] 334. Processing is complete.

Thus, the 8 LSBs of the stage_2 lookup address 330 at which the IVID 306 is stored are stored at a location specified by the 10 MSBs of the VLAN ID 334 in the stage_1 lookup 302.

For example, if the IVID 306 is 1000 1000, the VLAN ID is 1010 1010 1010 and the address of the four locations in the stage_2 lookup assigned to the VLAN ID are 00 1110 1110, 01 1110 1110, 10 1110 1110 and 11 1110 1110. Thus, 1110 1110 is stored at location 10 1010 1010 in stage_1 lookup 302, 1000 1000 is stored at location 10 1110 1110 in stage_2 lookup 304 and 0010 is stored at location 1010 1010 in stage_1 free list 320.

Figure 3F:
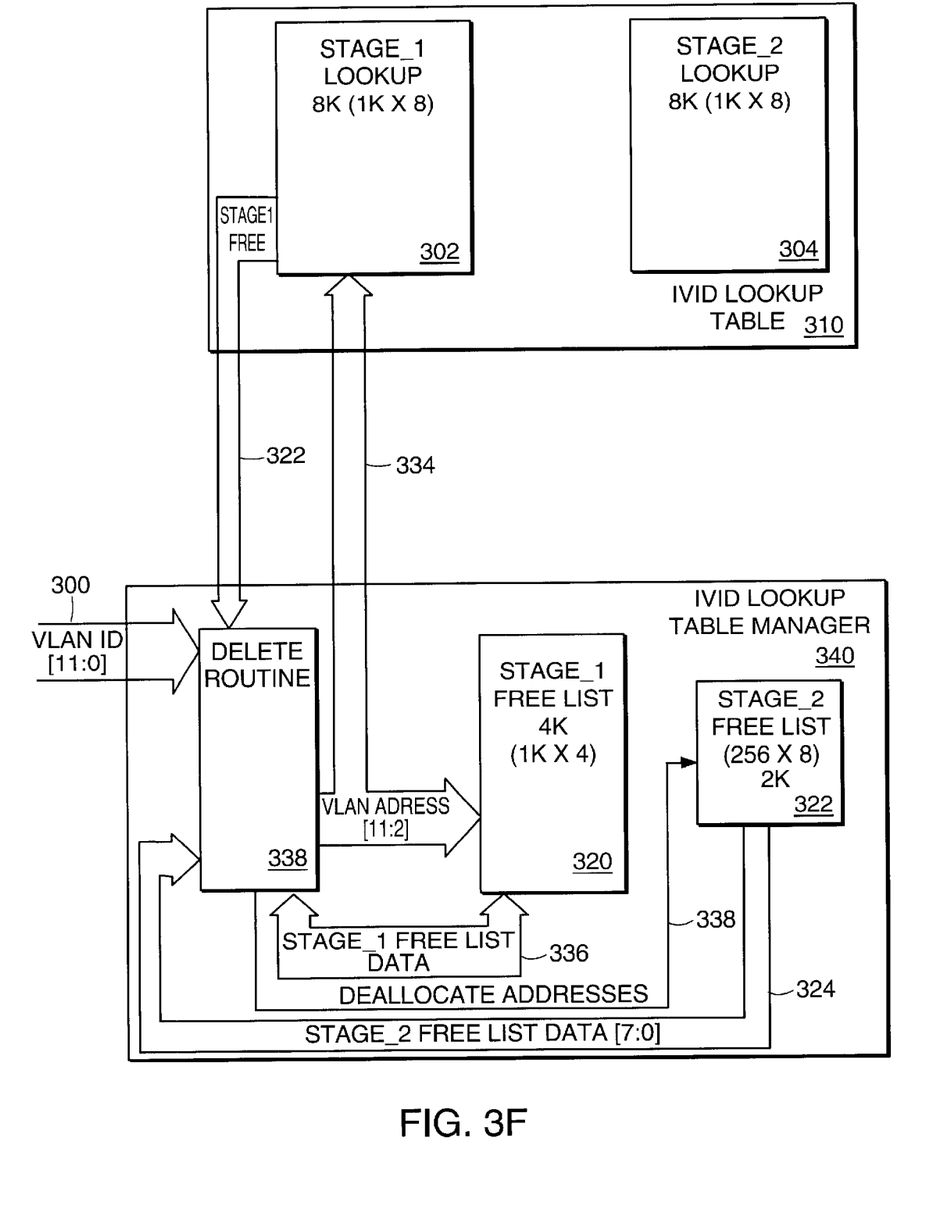
FIG. 3F is a block diagram illustrating a delete routine in the IVID lookup table Manager for deleting an IVID from the IVID lookup table shown in FIG. 3A.

FIG. 3F illustrates the delete routine 338 in the IVID lookup table manager 340 for deleting an IVID 306 from the IVID lookup table 310. The 12-bit VLAN ID[11:0] for which the IVID 306 is to be deleted is forwarded to the delete routine 338. The delete routine 338 is described in conjunction with FIG. 3G. Typically, this delete routine would be implemented in software, but it is conceivable that the delete routine may be implemented in hardware.

Figure 3G:
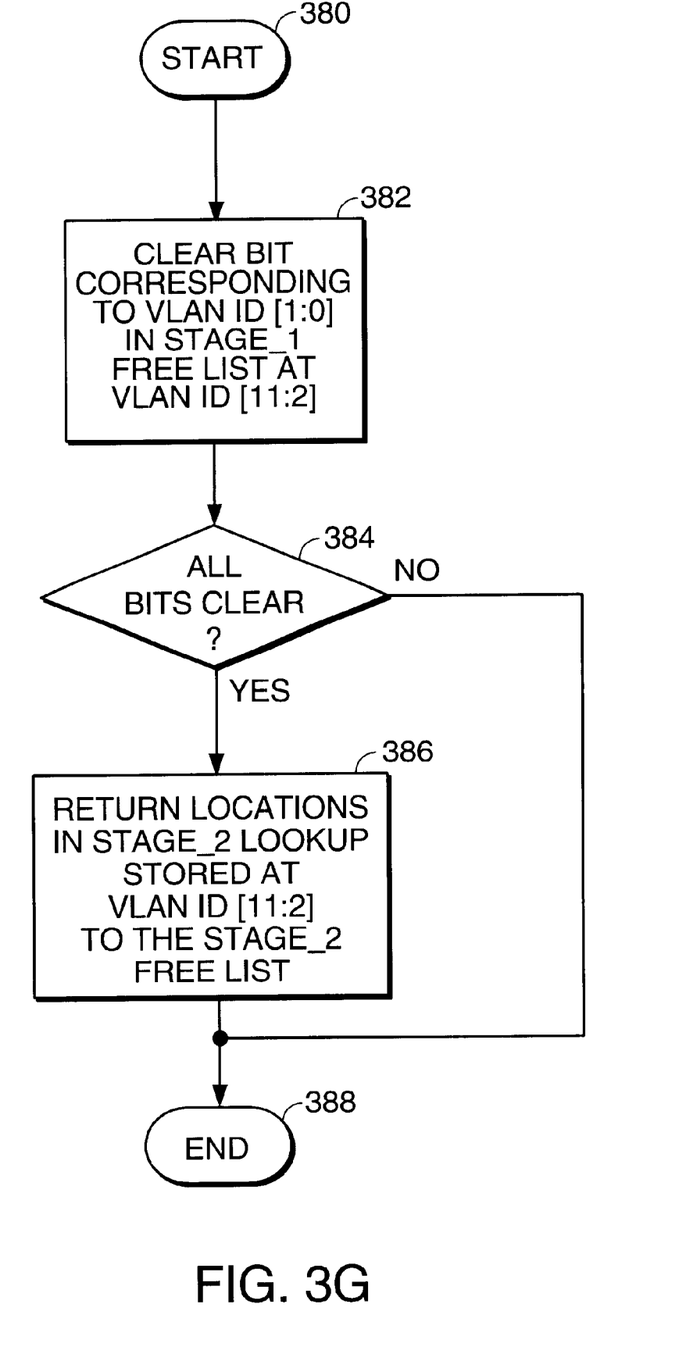
FIG. 3G is a flowchart illustrating the steps performed in the delete routine shown in FIG. 3F for deleting an IVID from the IVID lookup table.

FIG. 3G is a flowchart illustrating the steps performed in the delete routine 338 shown in FIG. 3F to delete an IVID 306 from the IVID lookup table 310.

At step 382, the delete routine 338 reads the entry stored at location VLAN ID [11:2] 334 in stage_1 free list 320. The entry stores a bit for each of the four locations in stage_2 lookup 304 allocated to the VLAN ID 300. The 4-bit stage_1 free list data[3:0] 336 stored in the entry is forwarded to the delete routine 338. The delete routine 338 modifies the stage_1 free list data[3:0] by clearing a bit in the stage_1 free list data[3:0] dependent on the state of the 2 LSBs of the VLAN ID[1:0]. The delete routine 338 writes the modified stage_1 free list data[3:0] 336 in the stage_1 free list 320 at the location specified by VLAN[11:2]. Processing continues with step 384.

At step 384, the delete routine 338 checks if all bits in the modified stage_1 free list data[3:0] 336 are clear indicating that the 4 allocated locations in stage_2 lookup 304 are no longer needed. If so, processing continues with step 386. If not, processing is complete.

At step 386, the delete routine 338 reads the stage_1 data 332 stored in stage_1 lookup 302 at location VLAN ID[11:2] 334. The stage_1 data 332 is the 8 LSBs of the index to four locations in the stage_2 lookup 304 assigned to the 10 MSBs of the VLAN ID 300. The delete routine 338 returns these four locations to the stage_2 free list by forwarding the stage_1 data 332 read from the stage_1 lookup 302 on stage_2 free list data 324 to the stage_2 free list 322 together with the deallocate addresses command 338. The returned stage_2 lookup locations to the stage_2 free list can be used to store other IVIDs later by the insert routine 318. Processing is complete.

Figure 4A:
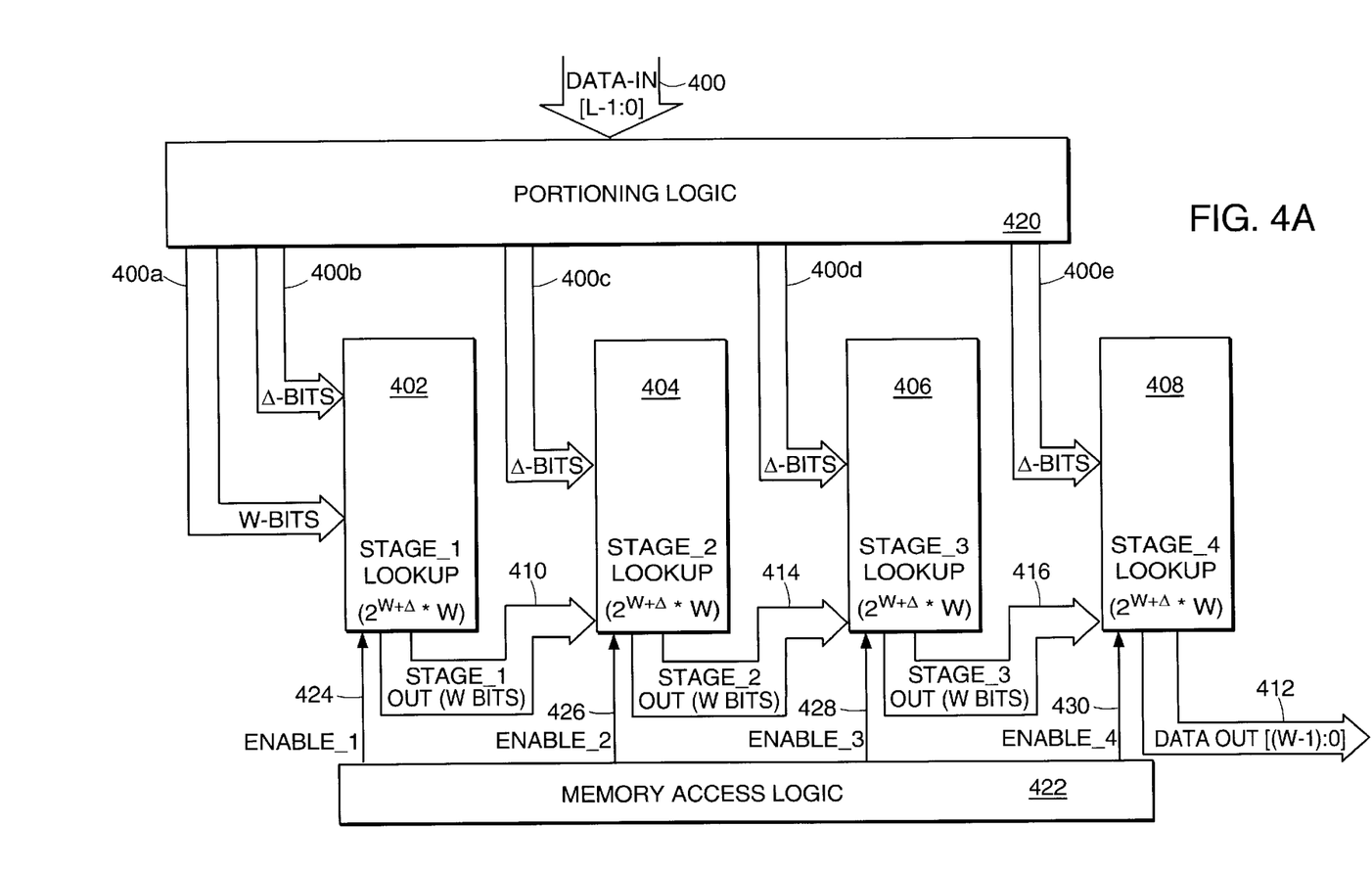
FIG. 4A illustrates a 4 stage memory lookup table in the VLAN ID to IVID translator shown in FIG. 2 for translating an L-bit input signal to a W-bit output signal where W is less than L.

FIG. 4A illustrates a 4-stage lookup table 418 for translating an L-bit data-in signal 400 to a W-bit data-out signal 412, where W is less than L. Portioning logic 420 portions data-in 400 into a plurality of subsets of bits 400a–e. The portioning of the L-bit data-in signal 400 is described in conjunction with FIG. 4B.

Figure 4B:
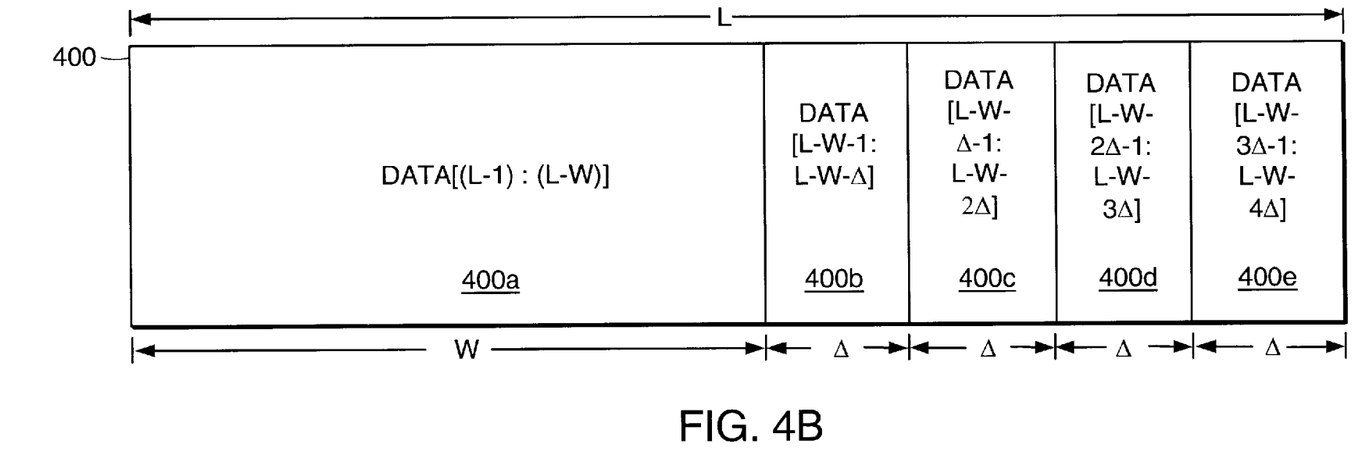
FIG. 4B illustrates the L-bit input signal shown in FIG. 4A portioned into a first subset of bits and four delta subsets of bits.

FIG. 4B illustrates the L-bit data-in signal 400 portioned into a first subset of bits 400a, a first delta subset of bits 400b, a second delta subset of bits 400c, a third delta subset of bits 400d and a fourth delta subset of bits 400e. The first subset of bits 400a stores the Most Significant bits ("MSBs") of the input signal 400. The number of bits (W) in the first subset of bits 400a is equal to the number of bits in a data-out signal 412. Each delta subset of bits 400b–e has an equal number of bits (($\Delta$)-bits).

Continuing with FIG. 4A, the 4-stage lookup table 418 includes a plurality of stage lookups 402, 404, 406, 408. The number of lookups is dependent on the number of delta subsets of bits 400b–e (FIG. 4B) provided by the portioning logic 420 from the data-in signal 400. In the embodiment shown in FIG. 4B, there are four delta subsets of bits 400b–e thus the corresponding number of stage lookups 402, 404, 406, and 408 are provided as shown in FIG. 4A.

Each of the stage lookups 402, 404, 406, 408 is W-bits wide, the same number of bits as the data-out signal 412. The data-in signal 400 provides the index to the 4-stage lookup table 418. The first subset of bits 400a (W-bits) and the first delta subset of bits 400b (($\Delta$)-bits) are forwarded to the stage_1 lookup 402 to provide the (W+($\Delta$))-bit index. With enable_1 signal 424 enabling access to stage_1 lookup 402, generated by memory access logic 422 the (W+($\Delta$))-bit index selects one of the W-bit entries stored in the stage_1 lookup 402. The data stored in the selected entry is forwarded on stage_1 data out 410 to stage_2 lookup 404.

The second delta subset of bits 400c ((Δ)-bits) and the stage_1 data out 410 (W-bits) combine to provide the (W+(Δ))-bit index to the stage_2 lookup 404. With enable_2 signal 426 generated by memory access logic 422 enabling access to stage_2 lookup 404, the (W+(Δ))-bit index selects one of the W-bit entries stored in the stage_2 lookup 404. The data stored in the selected entry is forwarded on stage_2 data out 414 to the stage_3 lookup 406.

The third delta subset of bits 400d ((Δ)-bits) and the stage_2 data out 414 (W-bits) combine to provide the (W+(Δ))-bit index to the stage_3 lookup 406. With enable_3 signal 428 generated by memory access logic 422 enabling access to stage_3 lookup 406, the (W+(Δ))-bit index selects one of the W-bit entries stored in the stage_3 lookup 406. The data stored in the selected entry is forwarded on stage_3 data out 416 to the stage_4 lookup 408.

The fourth delta subset of bits 400e ((Δ)-bits) and the stage_3 data out 416 (W-bits) combine to provide the (W+(Δ))-bit index to the stage_4 lookup 408. With enable_4 signal 430 generated by memory access logic 422 enabling access to stage_4 lookup 408, the (W+(Δ))-bit index selects one of the W-bit entries stored in the stage_4 lookup 408. The (W-bit) data stored in the selected entry is forwarded on the output signal 412. Thus, the L-bit data-in signal 400 is translated to a W-bit data-out signal 412 through the 4-stage lookup table 418.

TABLE 1

| L | W | Delta | n | h | w | Total (bits) | |
|---|---|---|---|---|---|---|---|
| 12 | 8 | 1 | 4 | 512 | 8 | 16K | 4 stage |
| 12 | 8 | 2 | 2 | 1024 | 8 | 16K | 2 stage |
| 12 | 8 | 4 | 1 | 4096 | 8 | 32K | single stage |
| 16 | 8 | 1 | 8 | 512 | 8 | 32K | 8 stage |
| 16 | 8 | 2 | 4 | 1024 | 8 | 32K | 4 stage |
| 16 | 8 | 4 | 2 | 4096 | 8 | 64K | 2 stage |
| 16 | 8 | 8 | 1 | 65536 | 8 | 512K | single stage |
| 20 | 12 | 1 | 8 | 8192 | 12 | 768K | 8 stage |
| 20 | 12 | 2 | 4 | 16384 | 12 | 768K | 4 stage |
| 20 | 12 | 4 | 2 | 65536 | 12 | 1536K | 2 stage |
| 20 | 12 | 8 | 1 | 1048576 | 12 | 12288K | single stage |
| 40 | 8 | 1 | 32 | 512 | 8 | 128K | 32 stage |
| 40 | 8 | 2 | 16 | 1024 | 8 | 128K | 16 stage |
| 40 | 8 | 4 | 8 | 4096 | 8 | 256K | 8 stage |
| 40 | 8 | 8 | 4 | 65536 | 8 | 2048K | 4 stage |
| 40 | 8 | 16 | 2 | 16777216 | 8 | 262144K | 2 stage |
| 40 | 8 | 32 | 1 | 1.1e+12 | 8 | 8589934592K | single stage |

Table 1 compares the memory requirements for a multi-stage lookup tables and single stage lookup tables. The variables are defined as follows: L is the number of bits in the data-in signal 400 (FIG. 4A); W is the number of bits in the data-out signal 412 (FIG. 4A); Delta is the number of bits in each delta subset of bits 400b–e (FIG. 4A); n is the number of lookup stages (FIG. 4A) in the lookup table 418 (FIG. 4A); h is the number of entries in each stage; w is the width of each lookup stage and W is at least the size of w.

As shown in Table 1, 32K-bits are required to translate a 12-bit input signal to an 8-bit output signal in the prior art single stage lookup table. The memory requirement for the lookup table is reduced by a factor of two to 16K-bits in a 2-stage or 4-stage lookup table according to the principles of the present invention.

512K-bits are required to translate a 16-bit input signal to an 8-bit output signal in a prior art single stage lookup table. The overall memory requirement for the lookup table is reduced by a factor of four to 64K-bits in a 2-stage lookup table according to the principles of the present invention. The overall memory requirement for the lookup table is further reduced by a factor of two in either a four-stage or an eight-stage lookup table though each stage of the latter would be half the size of the former.

12,288K-bits are required to translate a 20-bit input signal to a 12-bit output signal. The memory requirement is reduced by a factor of eight to 1526K in a 2-stage lookup table according to the principles of the present invention. The memory requirement can be further reduced by a factor of 2 to 768K in either a 4-stage or a 8-stage lookup table.

8589934592K-bits are required to translate a 40-bit input signal to a 12-bit output signal. The memory requirement can be reduced to 128K-bits in either a 32-stage or a 16-stage lookup table.

The memory requirement for translating an L-bit input signal to a W-bit output signal is determined using the following algorithm; where W is the total number of bits in the output signal, Δ is the number of bits in a delta subset of bits in the input signal and n is the number of delta subsets of bits in the input signal.

$$\text{Memory} = (n * 2^{(W+\Delta)} * W) \text{bits}$$

Thus, the use of a multi-stage lookup table to translate an input signal to an output signal where the number of bits in the output signal is less than the number of bits in the input signal decreases the memory size of the lookup table.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for translating an input digital data having a first number of bits to an output digital data having a second number of bits, the first number of bits greater than the second number of bits, comprising the steps of:

portioning the input digital data into a first subset and a plurality of equal size of second subsets, the number of bits of the first subset being at least the same as the number of bits of the output digital data;

providing a multi-stage lookup table comprising a same number of stages as a number of portioned second subsets, each stage lookup table storing indexed data having the same number of bits as the output digital data; and sequentially performing by each stage lookup table, a lookup in each of the lookup tables, a first lookup to a first stage lookup table performed using a first index equal to a combination of the first subset and a first portioned second subset, a next lookup to a next stage lookup table performed using a second index equal to a combination of a result of a previous lookup and a next portioned second subset and the output digital data provided as a result of a last lookup to a last stage lookup table.

2. The method as claimed in claim 1 wherein the first subset stores the most significant bit of the input digital data.

3. The method as claimed in claim 1 wherein the number of stage lookup tables is two.

4. The method as claimed in claim 1 wherein the number of stage lookup tables is four.

5. The method as claimed in claim 1 wherein the size of the stage lookup tables is dependent on the size of an index equal to the combination of the result of a previous lookup and the number of bits in the second subset.

6. The method as claimed in claim 1 wherein the width of each stage lookup table is dependent on the number of bits in the output digital data.

7. The method as claimed in claim 1 wherein the first number of bits is twelve, the second number of bits is eight, the number of bits in the second subset is two and the number of stage lookup tables is two.

8. The method as claimed in claim 1 wherein the first number of bits includes a second subset.

9. A method for translating an input digital data having a first number of bits to an output digital data having a second number of bits, the first number of bits is greater than the second number of bits, comprising the steps of:

portioning the input digital data into a first subset and a plurality of equal size of second subsets, the number of bits of the first subset being the same as the number of bits of the output digital;

providing a multi-stage lookup table comprising a same number of stages as a number of portioned second subsets, each stage lookup table having a same width as the number of bits of the output digital data;

indexing to a first stage lookup table of the multi-stage lookup table using an index equal to a combination of the first subset and a first portioned second subset, and providing an indexed data to the next stage lookup table;

continuing indexing to the next stage lookup table using an index equal to a combination of the indexed data from previous stage lookup table and a following portioned second subset to provide an indexed data to the next stage lookup table until a last stage lookup table is indexed; and providing the indexed data from the last stage lookup table as the output digital data.

10. The method as claimed in claim 9 wherein the first subset stores the most significant bit of the input digital data.

11. The method as claimed in claim 9 wherein the number of stage lookup tables is two.

12. The method as claimed in claim 9 wherein the number of stage lookup tables is four.

13. The method as claimed in claim 9 wherein the size of the stage lookup tables is dependent on the size of an index equal to the combination of the result of a previous lookup and the number of bits in the second subset.

14. The method as claimed in claim 9 wherein the width of each stage lookup table is dependent on the number of bits in the output digital data.

15. The method as claimed in claim 9 wherein the first number of bits is twelve, the second number of bits is eight, the number of bits in the second subset is two and the number of stage lookup tables is two.

16. The method as claimed in claim 9 wherein the first number of bits includes a second subset.

* * * * *